(12) United States Patent
Chen

(10) Patent No.: US 7,852,915 B2
(45) Date of Patent: Dec. 14, 2010

(54) ADAPTIVE EQUALIZER FOR COMMUNICATION CHANNELS

(75) Inventor: Weizhong Chen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 852 days.

(21) Appl. No.: 11/726,318

(22) Filed: Mar. 21, 2007

(65) Prior Publication Data

US 2008/0232439 A1 Sep. 25, 2008

(51) Int. Cl.
*H03H 7/30* (2006.01)
(52) U.S. Cl. ..................................... 375/233
(58) Field of Classification Search ................. 375/232, 375/233
See application file for complete search history.

(56) References Cited

U.S. PATENT DOCUMENTS

| | | | | |
|---|---|---|---|---|
| 5,561,687 | A  * | 10/1996 | Turner | 375/233 |
| 6,466,616 | B1 * | 10/2002 | Stenstrom et al. | 375/233 |
| 6,798,832 | B1 | 9/2004 | Nakata et al. | |
| 2003/0235245 | A1 * | 12/2003 | Erdogan et al. | 375/232 |

FOREIGN PATENT DOCUMENTS

EP 0675608 B1 10/1995
WO 9724802 A1 7/1997

OTHER PUBLICATIONS

M.Vedat Eyubogle, Reduced-State Sequence Estimation with Set Partitioning and Decision Feedback, IEEE vol. 36, Jan. 1988 p. 13-20.
Zhenhong Li, Olli Piirainen, Aarne Mammela, An Adaptive RSSE-PSP Receiver with a Pre-filter for Edge Systems, IEE Apr. 2004 p. 3594-3598.
Naofal Al-Dhahir, Fast Computation of Channel-Estimate Based Equalizers in Packet Datat Transmission, IEE vol. 43 Nov. 1995 pp. 2462-2473.
Frank M.Hsu, Square Rot Kalman Filtering for High-Speed Data Received over Fading Dispersive HF Channels, IEEE vol. 28 Sep. 1982.
Riccardo Raheli, Per-Survivor Processing: A General Approacj to MLSE in Uncertain Environments, IEEE vol. 43 Feb. 1995, pp. 354-364.
Micro-Linear Corporation, "ATM 155Mbps UTP Transceiver," Jul. 1999, http://www.ic-on-line.cn/IOL/viewpdf/ML6674_3529875. htm,p. 5 lines 12-20.
PCT International Search Report and Written Opinion PCT/US2008/055992, dated Jul. 22, 2008.

* cited by examiner

*Primary Examiner*—Kevin Y Kim
(74) *Attorney, Agent, or Firm*—Charles W. Bethards

(57) ABSTRACT

Adaptive equalizers for a communication channel and corresponding methods of equalizing are described. The adaptive equalizer includes: a fixed pre-filter configured to be coupled to a received signal and provide a pre-filter signal; an adaptive filter coupled to and configured to compensate the pre-filter signal for changes in phase and amplitude; and an interference remover coupled to the adaptive filter and configured to reduce interference in the received signal.

22 Claims, 5 Drawing Sheets

-PRIOR ART-

ADAPTIVE EQUALIZER FOR COMMUNICATION CHANNELS

FIELD OF THE INVENTION

This invention relates in general to communications equipment and adaptive equalizers that are used in such equipment for equalizing or compensating signals that are transmitted over communication channels and more specifically to techniques and apparatus for improving such equalizers.

BACKGROUND OF THE INVENTION

Equalizers and adaptive equalizers are often used to compensate for interference or distortions that occur in a signal during transmission over a communication channel including anomalies in the signal that are generated at the transmitter or receiver and over the transmission medium. One common type of interference is generally referred to as InterSymbol Interference (ISI), which denotes the impact on a given symbol that may result from neighboring symbols, normally previously transmitted symbols. ISI may result from various factors, including intentional causes, e.g., transmitter filters used for spectral efficiency or receive filters used for adjacent channel interference reduction, or undesirable and largely uncontrollable causes, e.g., multi-path fading in the channel or transmitter & receiver imperfections.

Multi-path fading distorts a transmitted symbol in both shape as well as symbol duration or length (commonly referred to as dispersion). Communication channels may exist in differing fading environments with the resultant distortion varying significantly. One example of a present communications system that is widely used for various cellular phone communications systems is commonly referred to as EDGE (Enhanced Data rates for GSM Evolution, where GSM is an acronym for the Global System for Mobile Communications). In EDGE signal transmissions a transmitted symbol pulse lasts for 4 symbol periods. It has been observed that communication over a Hill Terrain (HT) channel or a Rural Area (RA) channel can expand or lengthen the received symbol pulse by 5.4 symbol periods. Additionally, movement between the transmitter and receiver (typically due to a mobile station (MS) traveling relative to base station (BS)) will result in changes in the received symbol pulse over time, with the rate of change being a function of the rate of movement (speed of travel).

Many communication systems, such as an EDGE system utilize a training sequence that is transmitted as part of a burst (collection of a multiplicity of symbols) and in EDGE is located in the middle of the burst. The training sequence allows the receiver at the mobile or base station to estimate the characteristics of the channel (channel estimation). Given the channel estimation various forms of Equalizers have been used or proposed which reduce the ISI. Unfortunately such Equalizers tend to consume large amounts of processing resources, e.g. processor cycles, memory space, etc., and often have performance limitations when dealing with different combinations of channel complexity (amount of or rates of fading) and signal levels.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

In overview, the present disclosure concerns communication equipment and equalizers used therein, e.g., adaptive equalizers with improved performance for some communication channels together with some reduction in resources needed for such equalizers. More particularly various inventive concepts and principles embodied in methods and apparatus for performing adaptive equalization will be discussed and disclosed.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware or various combination thereof. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
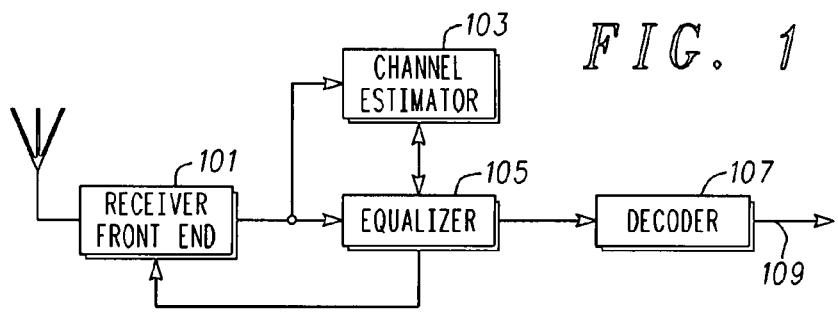
FIG. 1 depicts in a simplified and representative form, a high level diagram of a receiver including an adaptive equalizer in accordance with one or more embodiments.

Referring to FIG. 1, a simplified and representative high level diagram of a receiver including an adaptive equalizer in accordance with one or more embodiments will be briefly discussed and described. FIG. 1, shows a receiver front end 101 that receives a transmitted signal, e.g., from an antenna, and then amplifies, filters, and converts or translates that signal to a lower frequency and normally also converts the resultant analog signal to a digital signal. The signal from the receiver front end is coupled to a channel estimator 103 or estimation function as well as a channel equalizer or equalizer 105. The output from the equalizer is provided as soft information (soft bits or symbols, i.e. a symbol together with confidence information) to a decoder 107 that handles error correction, etc, and provides received bits or data that are coupled to further functions, e.g., media access control (MAC), etc.

The received signal can be represented as follows $$x_n = \sum_{i=0}^{L-1} h_i I_{n-i} + \eta_n \quad (1)$$

where $h_n$ ($h_i$) is a composite Channel Pulse Response (CPR) over L symbol periods, where L is the length of the composite CPR in symbols, $I_n$ is an information or symbol sequence as transmitted, and $\eta_n$ represents the combination of Additive White Gaussian Noise (AWGN), co-channel interference and adjacent channel interference. The composite CPR $h_n$ includes the effects of the channel on the transmitted symbol pulse, including ISI, multi-path fading, and receiver filters.

Figure 2:
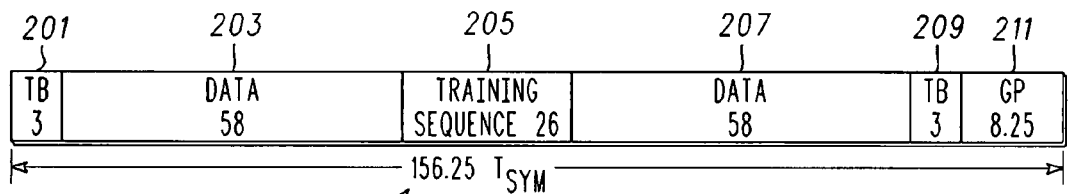
FIG. 2 depicts a diagram of bit allocation in an exemplary EDGE burst transmission.

Referring additionally to FIG. 2, a diagram of bit allocation in an exemplary EDGE burst transmission will be briefly discussed and described and used to further describe the channel characterization and equalizer of FIG. 1 and others. FIG. 2 shows one burst in an EDGE system. It is understood that other systems and air interface standards may have other allocation maps. The EDGE burst occupies or has a duration of or spans 156.25 symbol periods 200 or 156.25 bit periods or bit times at 1 bit per symbol. In EDGE, each symbol period is equivalent to 577 micro-seconds. As shown, the EDGE burst includes and spans 3 tail bits 201, a first data field 203 that includes or spans 58 bits, a training sequence 205 of 26 bits, a second data field 207 that includes or spans 58 bits, 3 more tail bits 209, followed by a gap 211 equivalent to 8.25 bit times. The training sequence is a predetermined sequence of symbols or bits as specified in the relevant standards, e.g., EDGE standards. As is known and specified in the various air interface standards for EDGE systems, 8 bursts comprise one Time Division Multiplex Access (TDMA) frame, which is transmitted via one radio frequency carrier. Different TDMA frames may be frequency hopped on different radio frequency carriers. Twenty-six (26) TDMA frames comprises one multiframe. Fifty-one multiframes are included in a superframe and 2048 superframes are included in a hyperframe.

The channel estimator 103 or estimation process estimates the composite CPR $h_n$ from the received signal $x_n$ corresponding to the training sequence and the known training sequence $I_n$ 205 for each transmitted and thus received burst, via the relationship in equation (1) using one or more generally known techniques, e.g., Minimum Mean Square Error (MMSE) or Weighted MMSE. The equalizer 105, given the channel estimation from the channel estimator, generally operates or functions to remove or reduce distortion or interference in the received symbols or bits. The training sequence by being placed in the middle of a burst allows information symbols closest to the training sequence to facilitate reduction of the impact of channel variations over or during the burst. With this arrangement of the training sequence, the equalizer can operate or adjust or compensate in both directions, i.e., from the training sequence to earlier received data or the first data field 203 as well as later received data or the second data field 207, and thereby better account for channel variations over the time duration or span of the received signal burst (or burst of the received signal).

Figure 3:
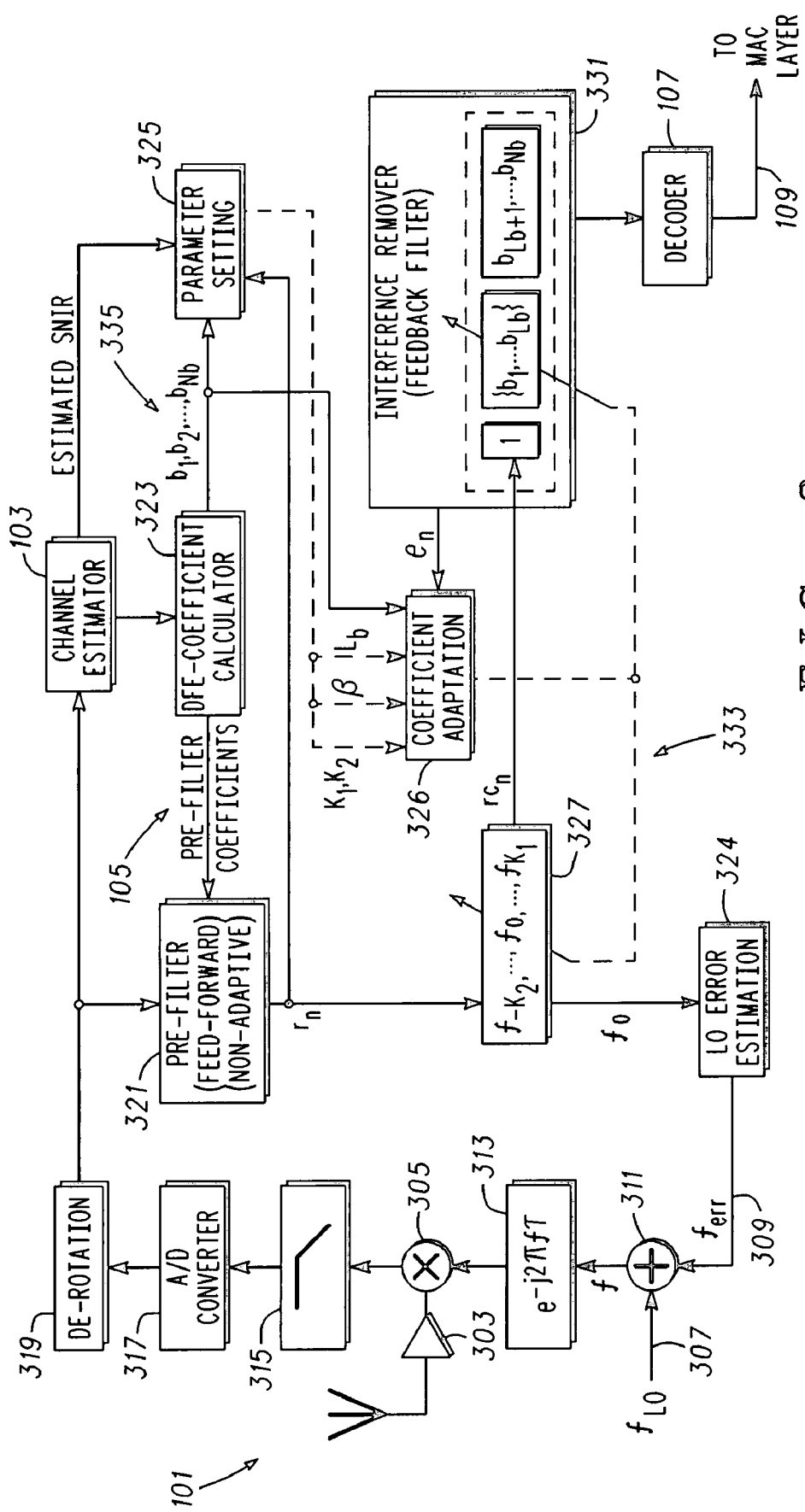
FIG. 3 in a representative form, shows a more detailed diagram of the receiver and equalizer of FIG. 1, which illustrates a new structure for the equalizer in accordance with various embodiments.

Referring to FIG. 3, a representative and more detailed diagram of the receiver and equalizer of FIG. 1, which illustrates a new structure for the equalizer in accordance with various embodiments, will be discussed and described. FIG. 3 shows the receiver front end 101 further comprising an amplifier 303 coupled to, e.g., an antenna and driving a mixer 305. In the simplified diagram of FIG. 3, various selectivity and the like are not specifically shown but will ordinarily be utilized with the amplifier as will be appreciated by those of ordinary skill. The mixer 305 is a complex mixer with In phase and Quadrature (I, Q) outputs (not specifically shown). A local oscillator, which is typically a part of phase locked loop synthesizer (neither specifically shown) supplies a local oscillator signal with a frequency, $f_{LO}$, at 307. The frequency of the local oscillator signal is adjusted by an adder function 311 to remove a frequency error, $f_{err}$, supplied at 309 to provide a resultant frequency, f. A phasor with frequency, f, is provided by the phasor operation 313 and this is used to drive the mixer 305 to translate or down convert the receive signal. The outputs of the mixer are filtered by filter 315 to remove higher frequency components with the outputs from the filter then converted to a digital signal by analog to digital converter (ADC) 317. In one or more exemplary embodiments, the output of the ADC 317 are complex samples with each of the I, Q signals comprising, e.g., for EDGE signals in one embodiment, 16 bit I and Q samples at a sample rate of 1-2 times the symbol rate, which is 270.83 thousand symbols per second. The signals or complex samples are de-rotated by the de-rotator or de-rotation function 319 in accordance with the relevant standard, e.g., for EDGE systems the de-rotation is $3\pi/8$ for 8-PSK (phase shift keyed) modulation and $\pi/2$ for GMSK (Gaussian Minimum shift keyed) modulation.

The output of the de-rotator 319 is provided or coupled to the channel estimator 103 and equalizer 105, specifically a pre-filter 321 or non-adaptive and fixed (over a given burst) pre-filter. The channel estimator 103 provides an estimate of the composite CPR $h_n$ as noted above. One technique or approach that has been widely used in equalizers to remove ISI is a Maximum Likelihood Sequence Estimation (MLSE)

process. To reduce the complexity of the MLSE one alternative technique or approach that has been used is referred to as a Decision Feedback Equalizer (DFE). In a DFE, the composite CPR $h_n$ as provided by the channel estimator 103 is essentially first converted into a CPR $\{b_n, n=0, 1, 2, \ldots, N_b\}$ of near minimum phase, by the pre-filter 321 or feed-forward filter $f'_n$; where $N_b$ is the length of the CPR. In one or more embodiments, $b_0$ is set to a constant value, e.g., $b_0=1$, where it will be appreciated that reference within these discussion to $b_0=1$ is merely one example of the constant value. This CPR may be referred to herein as a near minimum phase CPR, minimum phase CPR, CPR $b_n$, or similar designations. In an EDGE system or environment, $N_b=6$ is a desirable choice and represents a balance between complexity and performance. The pre-filter or feed forward filter $f'_n$ will typically have 20 taps or coefficients. The process of calculating the coefficients for pre-filter $f'_n$ and the minimum phase CPR $b_n$ from the estimated composite CPR $h_n$ is called DFE-Coefficient Calculation and is provided by the DFE coefficient calculator 323. The DFE-Coefficient calculator uses one or more generally known techniques given the composite CPR $h_n$ to determine the appropriate coefficients. One well known technique is referred to as a Minimum Mean Square Error (MMSE) approach and is described, e.g., in N. Al-Dhahir and J. M. Cioffi, "Fast Computation of Channel Estimate Based Equalizer In Packet Data Transmission," IEEE Trans. On Signal Processing, Vol. 43, No. 11, November 1995, pp 2462-2473.

Generally for each transmitted, i.e., received, burst or from time to time when a training sequence is available and possibly depending on a rate of channel changes over time, the channel estimator provides an estimate of the composite CPR and the DFE-Coefficient calculator provides the near minimum phase CPR or the CPR $b_n$ and pre-filter coefficients $f'_n$. The resources in terms of processing capacity and time generally limit the rate at which the channel estimator and DFE-Coefficient calculator can update CPR $b_n$ and pre-filter coefficients $f'_n$ and thus these parameters are only updated or re-calculated once per transmitted, thus received burst, i.e., once for each newly received training sequence. The pre-filter coefficients are passed from the coefficient calculator 323 to a fixed pre-filter or pre-filter 321. The pre-filter is a fixed or non-adaptive filter at least over a given burst of the received signal or specifically over each of the earlier and later halves of a given burst. The pre-filter 321 is configured to be coupled to the received signal or burst thereof and operates on the received signal and provides at its output a pre-filter or pre-filtered signal:

$$r_n = \sum_{k=0}^{M-1} x_{n-k} f'_k \qquad (2)$$

where M is the length of the pre-filter in symbol periods, e.g., 20-25, n is a symbol index, and k is a filter coefficient index. Thus the fixed pre-filter in one or more embodiments is coupled to a receive signal and configured to provide a pre-filter signal. The fixed pre-filter can be configured in accordance with filter coefficients provided by a decision feedback equalizer (DFE) coefficient calculator. These filter coefficients can be provided for each of the earlier half and the later half burst of the receive signal, i.e., once for the portion of the burst (203, 201) that is earlier than the training sequence and once for the portion of the burst (207, 209) that is later than the training sequence. It will be appreciated that references in this discussion to DFE coefficient calculations for or over a given burst include calculation of the DFE coefficients based on a given training sequence and this may include calculating the coefficients once for each portion of a given burst.

The pre-filtered result or signal r, can also be shown to be related to the transmitted information sequence $I_n$ and the near minimum phase CPR $b_n$ by $$r_n = \sum_{l=0}^{N_b} I_{n-k} b_l + w_n \qquad (3)$$

where $b_0=1$ and $w_n$ is Additive White Gaussian Noise. The pre-filter $f'_n$ is sometimes also called a whitening filter due to the fact that it converts the interference and noise $\eta_n$ (see equation 1) into AWGN $w_n$ or nearly AWGN $w_n$. From Eq (3), it can be seen that the remaining ISI after the pre-filter is simply $\{b_n, n=1, 2, \ldots, N_b\}$. The pre-filtered signal or result is passed or coupled along with the CPR $b_n$ and a noise plus interference level (SINR estimate from the channel estimator) to a parameter setting function 325. The parameter setting function 325 determines or calculates various parameters, e.g., $K_1$, $K_2$, $L_b$, $\beta$, and provides these parameters to a coefficient adaptor 326 or coefficient adaptation calculator, which uses these parameters in an adaptation process as will be further discussed below.

The pre-filtered signal $r_n$ is also passed to an adaptive filter 327, e.g., an adaptive finite impulse response (FIR) filter ($f_k$, $k=-K_1, \ldots 0, \ldots K_2$), where the coefficients $f_k$ are provided by the coefficient adaptor 326. The adaptive filter 327 is arranged and constructed and operates to compensate for changes in phase or in amplitude of the pre-filter signal that are caused by channel fading that occurs over the duration of a transmitted and thus received burst. A simple version of the adaptive filter 327 having a single coefficient $f_0$ ($K_1=K2=0$) will be discussed and described below with reference to FIG. 5. The $f_0$ coefficient, as adapted, is also provided to a local oscillator error estimator 329, which in one or more embodiments provides the $f_{err}$ value at 309 as will be further described below. If appropriate and desired, other higher order channel changes occurring during a burst can be compensated for with the other adaptive filter coefficients. Note that prior art equalizers do not utilize any adaptive filter or filtering function, such as the adaptive filter 327 operating on the pre-filter signal. The output of the adaptive filter 327 with the pre-filtered signal $r_n$, as an input, is a compensated signal $rc_n$ (compensated for channel fading, etc.) and can be represented by:

$$rc_n = \sum_{k=-K_1}^{K_2} f_k^{n-1} r_{n-k}. \qquad (4)$$

Figure 5:
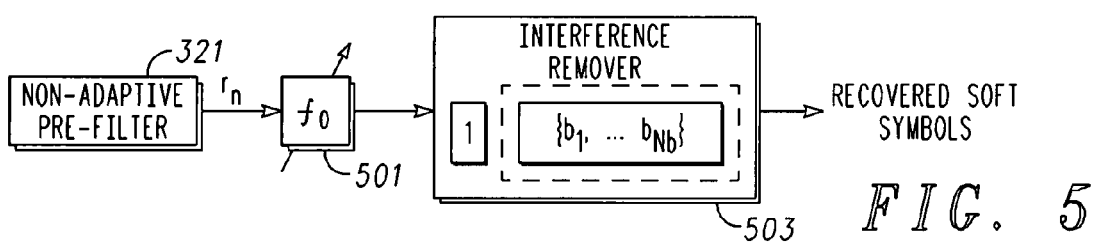
FIG. 5 depicts certain functional elements that may be used in the FIG. 3 equalizer in accordance with one or more embodiments.
Figure 8:
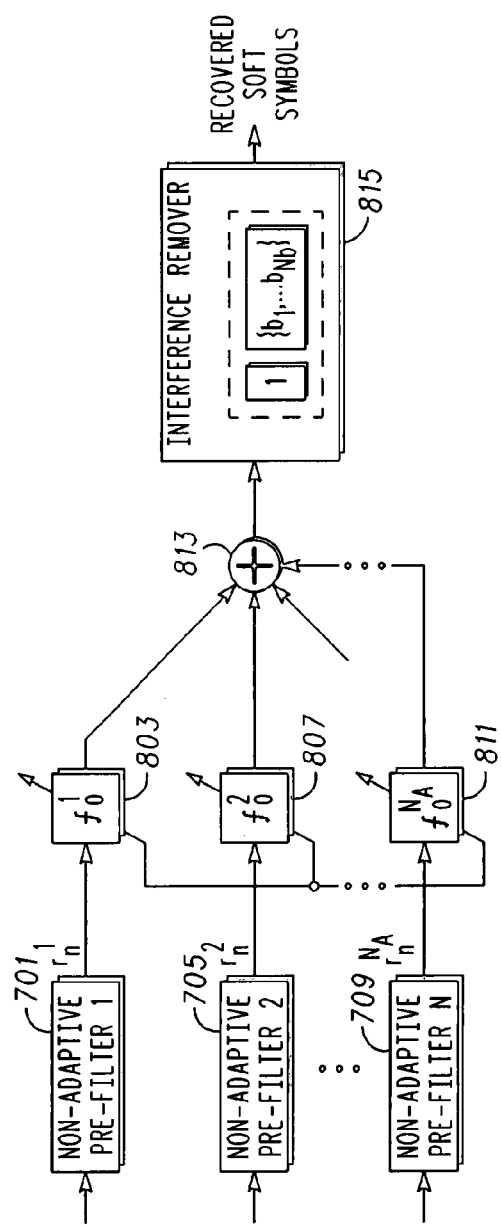
FIG. 8 illustrates a portion of an equalizer employing signal processing, similar to FIG. 5, that is suitable for use in a diversity receiver in accordance with one or more embodiments.

Thus the adaptive filter is coupled to and configured to compensate the pre-filter signal for changes in phase or amplitude over a received signal burst or span of a burst of the receive signal to provide a compensated signal. The adaptive filter, in some embodiments, further comprises a multi tap finite impulse response (FIR) filter and may be a single tap adaptive filter (FIGS. 5, 8). The coefficient adaptor is configured to determine and dynamically change or adapt coefficients for the single tap or multi-tap versions of the FIR filter over the received signal burst.

The compensated signal or output $rc_n$ of the adaptive filter is provided to or coupled to an interference remover 331, e.g., a feedback filter, that is configured and operates or functions to compensate for or to remove or reduce interference, e.g., ISI, in the received signal. The interference remover 331 is also provided the near minimum phase CPR coefficients {$b_n$, n=1, 2, ..., $N_b$} (recall that $b_0$ is set to 1) and in some embodiments possibly various other parameters by the coefficient adaptor 326. In some embodiments, a portion, $L_b$, of the near minimum phase CPR coefficients, i.e., $b_1$, ... $b_{Lb}$, may be adapted as suggested by FIG. 3 with the remaining CPR coefficients remaining fixed, i.e., not adapted, over a given burst, while in other embodiments none of the CPR coefficients are adapted over a given burst (see, e.g., FIG. 5). Adapting only a portion or none of the CPR coefficients is distinct from prior art equalizers, where all of the coefficients of the CPR {$b_n$, n=0, 1, 2, ..., $N_b$} are adapted over a given burst. The value or parameter $L_b$ is determined by the parameter setting function 325 as further described below and then $L_b$ is provided to the coefficient adaptor 326 as shown. The interference remover 331 returns an error term $e_n$ to the coefficient adaptor 326 for use therein as will be further described below.

The output from the interference remover 331 is coupled as soft symbols or bits to the decoder 107 which operates as known to provide received data or bits to further functions, e.g., a MAC layer 109 or the like. The equalizer 105 or adaptive equalizer can be viewed as a signal processor 333 or processing functions or operations and a controller 335 or equalizer controller or controlling functions and operations. The signal processor 333 portion of the equalizer 105 comprises the pre-filter 321, adaptive filter 327, and interference remover 331. These signal processor 333 or processing functions operate on the received signal to remove interference, e.g., ISI and the like. The controller 335 comprises the DFE coefficient calculator 323, parameter setting function 325, coefficient adaptor 326, which operate given a channel estimate for a given burst, to establish initial conditions, e.g., pre-filter coefficients and the minimum phase CPR as well as various other parameters and in some embodiments may facilitate adaptation of various coefficients or parameters.

It will be appreciated that many of the functional elements of FIG. 3, e.g., those bearing reference numbers 319 or higher and 105, or similar functional elements discussed below can be implemented in various manners including processor based functionality, e.g., a digital signal processor with appropriate memory resources and software instructions, or hardware based functions, or one or more combinations of each. It is noted that n as used above and throughout these discussions is a temporal index or symbol index, where n=0 occurs at the center of the training sequence in FIG. 2 and assumes negative values for earlier symbols (movement to the left of n=0 in FIG. 2) and positive values for later symbols (movement to the right in FIG. 2). The digital signal at the output of the ADC 319 may include a multiplicity of samples corresponding to each symbol.

Figure 4:
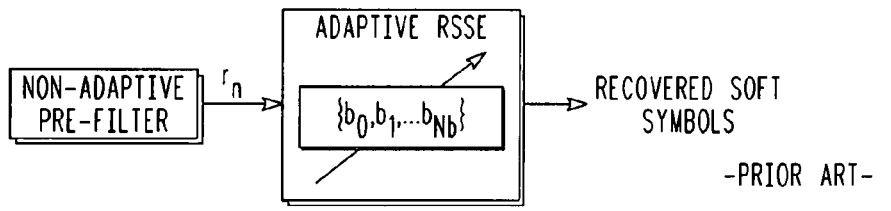
FIG. 4 depicts a representative high level diagram of a prior art RSSE (Reduced State Sequence Estimator.

Referring to FIG. 4 a representative high level diagram of an equalizer using RSSE (Reduced State Sequence Estimator) will be utilized to describe various equalizers and their respective limitations. The equalizer of FIG. 4 shows a non-adaptive pre-filter, e.g., similar to pre-filter 321 with an output coupled to an input of an adaptive RSSE, which in turn provides soft symbols as recovered. The coefficients for the non-adaptive pre-filter as well as the CPR {$b_n$, n=0, 1, 2, ..., $N_b$} are understood to be provided by a DFE-coefficient calculator, e.g., DFE-coefficient calculator 323. The RSSE approach for equalizers was developed starting with a Maximum Likelihood Sequence Estimation (MLSE) technique and problems therein.

With MLSE, the information sequence $I_n$ is estimated by convolving all possible transmitted information sequences with the estimated composite CPR $h_n$, comparing the results with the received signal, and choosing the one with the least matching error as the estimated information sequence $\hat{I}_n$. The known Viterbi Algorithm (VA) is the efficient approach to the sequence search, in which all possible information sequences are represented with a search trellis. The path in the trellis with the minimum error metric gives the estimate of the transmitted information sequence. The complexity of the VA increases exponentially with the length of the composite CPR $h_n$.

To reduce the complexity of MLSE, Decision Feedback Equalizer (DFE) was developed. In DFE, the composite CPR $h_n$ 103 as provided by the channel estimator is converted into a CPR {$b_n$, n=0, 1, 2, ..., $N_b$} of near minimum phase with $b_0$=1 by a pre-filter 321 or feed-forward filter $f'_n$. The process of calculating the pre-filter $f'_n$ and the minimum phase CPR $b_n$ from the estimated composite CPR $h_n$ is called DFE-Coefficient Calculation.

The estimation of the information sequence with DFE can be represented as follows:

$$y_n = \sum_{k=-M_1}^{M_2} x_{n-k} f'_k - \sum_{l=1}^{N_b} \hat{I}_{n-k} b_l \qquad (5)$$

where $y_n$ is the soft information sequence, normally called soft symbols, and $\hat{I}_n$ is the hard symbol estimated or determined based on the soft symbol $y_n$. In a binary or two state case the hard symbol is simply the sign of the soft symbol, $\hat{I}_n$=sig[$y_n$]. In more general cases, the hard symbol estimate is selected as the symbol that is closest to the corresponding soft symbol. The problems with DFE include error propagation, i.e., an error in $\hat{I}_n$ will continue to impact the soft information sequence $y_n$ for another $N_b$ symbols, which can degrade the radio link performance significantly in fading channels.

Reducing the error propagation in theory can be addressed by using DFE+MLSE and observing as noted above (see equation 3) that the remaining ISI is limited to the CPR {$b_n$, n=0, 1, 2, ..., $N_b$}. However even with $N_b$ chosen to be 6, a Viterbi search trellis will have $8^6$ or 262144 states to be calculated, remembered, etc which is clearly impractical for devices with limited computational resources, e.g., handheld communication devices.

To reduce the complexity of the DFE+MLSE, sub-optimal solutions referred to as Reduced State Sequence Estimator (RSSE) have been considered. RSSE uses the minimum-phase property or minimum energy delay property, of the CPR {$b_n$, n=0, 1, 2, ..., $N_b$} and includes two portions of state reduction. The first portion of state reduction includes the compensation of the ISI contribution due to the first few taps of the CPR {$b_n$, n=0, 1, 2, ..., $N_b$} with MLSE, while the ISI contribution associated with the rest of the taps are compensated with DFE. Because of the minimum phase property of the CPR, the first few taps of the CPR {$b_n$, n=0, 1, 2, ..., $N_b$} have more energy concentration than that of the rest of the taps. Meanwhile, the first few taps are related to the ISI contribution of the most recent decisions in Viterbi trellis search, which are less mature than earlier decisions. And the rest of the taps are related to the ISI contribution of earlier decisions, which are more mature (errors are less likely), thus this portion of ISI is compensated more accurately with DFE. Therefore, very little performance compromise is observed with this state reduction while significant complexity reduction is obtained. For the case of 8PSK modulation and the CPR $b_n$ with $N_b=6$, if the first 4 taps of ISI are compensated with MLSE and the remaining 2 taps of ISI is removed with DFE, the number of trellis states will be $8^4=4096$, a 64-time reduction, though this may still be prohibitive for handheld devices.

The second portion of state reduction in RSSE involves a technique called set partitioning for large sized alphabet modulation, such as 8PSK. The set partitioning is to partition the information symbol alphabet into groups using Ungerboeck set partitioning principles. For example, the alphabet of an 8PSK symbol in EDGE signal transmission includes 8 possibilities:

$$\{e^{jk\frac{\pi}{4}}, k = 0, 1, \ldots, 7\};$$

if the alphabet is partitioned into two groups, one group will be $$\{e^{jk\frac{\pi}{4}}, k = 0, 2, 4, 6\}$$

and the other group will be $$\{e^{jk\frac{\pi}{4}}, k = 1, 3, 5, 7\},$$

to ensure that the minimum Euclidean distance between elements within each group is maximized. In the reduced state trellis search associated with this set partitioning, a received symbol is first locally determined to belong to which symbol within each group associated with each surviving path; the trellis search followed is essentially to determine which group the received symbol belongs to. In the first step, the minimum Euclidean distance between elements within each group is larger than that in the original alphabet, thus reducing the probability of making an error in the first decision. That is why the decision made over the two independent steps will not cause significant performance degradation relative to the one step joint decision, while the complexity reduction is dramatic. In the case of 8PSK modulation and the $\{b_n\}$ with $N_b=6$, if the first 4 taps of ISI is compensated with MLSE and each of the 4 symbols associated with the first 4 taps are partitioned into 2 groups, and the ISI of the last two taps is compensated with DFE, the number of states of the search trellis will be $2^4=16$, which can be easily handled in handhold devices. This configuration of RSSE is normally referred as J=[2, 2, 2, 2, 1, 1].

The above described RSSE equalizer is non-adaptive, i.e., assumes the channel remains unchanged within a transmitted burst or at least the equalizer does not make any changes to account for such changes. In practice, it is shown to work properly only for static and slow fading. However, the performance can be very sensitive to the RF front-end LO errors even in static and slow fading, especially for high alphabet modulation, such as 8PSK. Furthermore, the performance of the non-adaptive RSSE equalizer degrades to a concerned level even in moderate fading such as TU50, and degrades significantly in fast fading such as HT100 and RA250 environments. Both the fading and the LO-offset cause the composite CPR $h_n$ to depart from the estimated composite CPR as the equalizer operates away from the training sequence. Ideally, both the pre-filter $f_n$ and the minimum phase CPR $b_n$ derived from the estimated CPR h, should be adaptively updated. However, updating both the pre-filter $f_n$ and the minimum phase CPR $b_n$ is impractical in modern systems, e.g., for 8PSK in EGDE, the pre-filter $f_n$ often has 20 taps and feedback filter $b_n$ has 7 taps. In the case of 16-state RSSE mentioned above, there are 16 surviving paths at each stage of the trellis search. With the per-survivor processing principle, 16 pairs of $f_n$ and $b_n$ need to be updated to track the channel variation, one for each survivor. In the case of 8PSK modulation in EGDE, it can be prohibitively expensive to adaptively update the 16 copies of $f_n$ and $b_n$ on the 16 survivors. In fact, other than complexity or resource concerns, it has also been observed that the adaptation of so many coefficients on each surviving path can cause stability issues in the GSM/EDGE operation environment, which includes a wide range of Signal to Noise Ratio, interference levels, and wide range of fading conditions.

To reduce the complexity and contain the instability problems for adaptive RSSE, typical equalizers use a pre-filter $f_n$ that is time-invariant, i.e., non-adaptive over a given transmitted burst, and adaptation is utilized or operates only on $b_n$ on each surviving path. The updating of the $b_n$ on each surviving path is independent of the other paths and thus, may be referred to as per-survivor based adaptive RSSE. The following discussion will, thus, omit the surviving path index. The updating of $b_n$ for RSSE is based on the error between the actually received signal, e.g., at the output of the pre-filter, and the model (equation 3), which can be represented as follows:

$$e_n = r_n - \sum_{l=0}^{N_b} I_{n-l} b_l^{n-1}. \quad (6)$$

The CPR or feedback coefficients $b_n$ are updated as follows $$\begin{bmatrix} b_0^n \\ b_1^n \\ \vdots \\ b_{N_b}^n \end{bmatrix} = \begin{bmatrix} b_0^{n-1} \\ b_1^{n-1} \\ \vdots \\ b_{N_b}^{n-1} \end{bmatrix} - \beta e_n \begin{bmatrix} I_n^* \\ I_{n-1}^* \\ \vdots \\ I_{n-N_b}^* \end{bmatrix}, n = 1, 2, \ldots \quad (7)$$

where the initial value of $$\begin{bmatrix} b_0^0 \\ b_1^0 \\ \vdots \\ b_{N_b}^0 \end{bmatrix}$$

is provided by the DFE-coefficient calculator; and β is a parameter controlling the tracking speed.

The coefficient adaptation (6) and (7) can be used for the equalizer of FIG. 4, which emphasizes the fact that the adaptation is made on each of the feedback taps $\{b_0, b_1, \ldots, b_{N_b}\}$. The coefficient updating in (7) is often called a Least Mean Squares (LMS) approach, in which the adaptation for different coefficients $\{b_0, b_1, \ldots, b_{N_b}\}$ is actually independent of each other. The advantage of the LMS approach is its low complexity. However, the price paid is its slow convergence or slow tracking capability. For complex channels with autocorrelation matrices having a large spread of eigenvalues), this slow tracking will cause significant performance compromise, especially for complex fading and fast fading. In practice, it is found that the solution can provide some gain in moderate and simple fading. However, this performance gain is found to be obtained at the price of performance loss in static and slow fading relative to non-adaptive RSSE. In addition, it is found that it does not work properly in fast and complex fading. This solution, thus, has limited success in practice, especially in high alphabet modulation, e.g., the 8PSK modulation in EDGE operation environment. Therefore, the FIG. 4 equalizer does not provide an efficient and effective solution that works over a wide range of operation environments without causing degradation in static and slow fading.

Referring to FIG. 5, certain functional elements that may be used in the FIG. 3 equalizer in accordance with one or more embodiments will be discussed and described. FIG. 5 shows the non-adaptive pre-filter 321 providing an output r, to an adaptive filter 501. The adaptive filter 501 is a simplified embodiment of the adaptive filter 327 in FIG. 3 and as shown, only one coefficient $f_0$ is being adapted or dynamically changed during a transmitted and thus received signal burst, while the feedback taps $\{b_0, b_1, \ldots b_{Nb}\}$ are fixed. The output from the adaptive filter 501 is coupled to an interference remover 503. In one or more embodiments, this can be an RSSE based interference remover, i.e., a feedback filter where as shown, $b_0$ is set to "1" and the remaining CPR coefficients are fixed, i.e., not adapted or not changed over the received signal burst. In other embodiments under appropriate conditions the interference remover 503 could be implemented using MLSE, DFE, RSSE, or per survivor based RSSE, or some combination of these approaches.

The particular embodiment of FIG. 5 is possible by recognizing that a first order approximation for channel variation, e.g., within an EDGE burst, can be represented as phase change and amplitude change, where a phase change may be due to either or both fading and receiver front-end LO error and the amplitude change may be due to fading. This first order approximation to channel change of a received signal x(n) can be represented as follows $$y(n) = c(n)x(n) \tag{8}$$

where $c(n) = a(n)e^{j\phi(n)}$ with a(n) representing amplitude attenuation and $\phi(n)$ representing phase change due to fading and LO error. This observation of the first order approximation to channel change indicates that it is possible to compensate for the channel change with only one complex coefficient. Based on the simplified channel change model, the adaptive tracking or error term used for such tracking is proposed as follows:

$$e_n = f_0^{n-1} r_n - \sum_{l=0}^{N_n} I_{n-l} b_l \tag{9}$$

where $\{b_0, b_1, b_2, \ldots, b_{N_b}\}$ are not tracked or adapted over a burst and $b_0 = 1$ is assumed, which can be ensured during DFE coefficient calculation. This error term or equation is analogous to equation 6 where the first term in equation 9 is indicative of the input to the interference remover as actually received and after the pre-filter 321 and the adaptive filter 501 and the second term is the expected value from the model (equation 3). This approach is shown in FIG. 5, which emphasizes the fact that in this embodiment, none of the feedback taps $\{b_0, b_1, b_2, \ldots, b_{N_b}\}$ are adapted, and only one coefficient $f_0$ is adapted in the adaptive filter 501, e.g., by the coefficient adaptor 326, and that coefficient is operating on the pre-filter output. This is in stark contrast to known approaches for implementing equalizers. It will be appreciated that a different interference remover, e.g., interference remover 331, could also be used with the single tap adaptive filter 501.

The adaptive filter of FIG. 5 in summary comprises a finite impulse response (FIR) filter with a single tap and corresponding coefficient $f_0$, and the FIR filter is arranged and configured to compensate for phase and amplitude changes in the pre-filter signal over a received signal burst on a symbol by symbol basis by adaptation or dynamically changing the coefficient $f_0$. The coefficient $f_0$ of the single tap FIR filter is adapted over the received signal burst, where, as will be further described below, adaptation of the coefficient is in accordance with a parameter ($\beta$) that corresponds to a tracking speed of the adaptation. The interference remover 503 is coupled to the compensated signal from the adaptive filter and is configured to reduce interference in the burst of the receive signal and to provide corresponding soft symbols. The interference remover 503 includes a feedback filter that is configured in accordance with near minimum phase coefficients $\{b_0, b_1, b_2, \ldots, b_{N_b}\}$ provided by, e.g., the DFE coefficient calculator 323 via the coefficient adaptor 326. In the FIG. 5 embodiment of the interference remover 503, the minimum phase coefficients are provided only one time for each burst of the receive signal and these coefficients are used to initialize and operate the interference remover.

Figure 6:
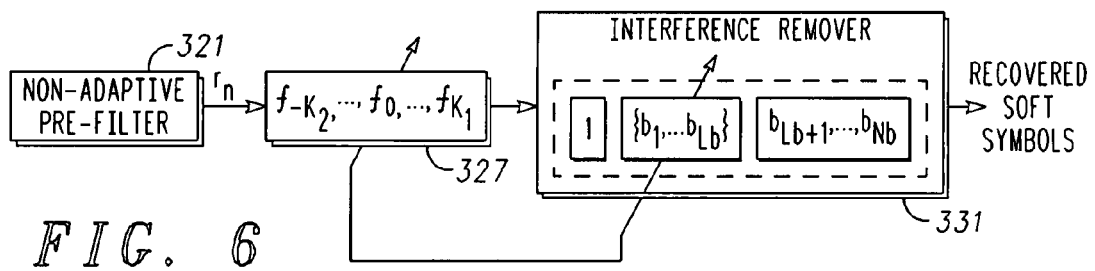
FIG. 6 illustrates a portion of the signal processing for the equalizer of FIG. 3 in accordance with one or more generalized embodiments.

With reference to FIG. 6, a portion of the signal processing for the equalizer of FIG. 3 in accordance with one or more generalized embodiments will be further discussed and described. FIG. 3 shows the pre-filter 321, adaptive filter 327, and interference remover 331 intercoupled as discussed with reference to FIG. 3 and operating to provide soft information or recovered soft symbols at an output of the interference remover. The signal processing functionality shown in FIG. 3 and FIG. 6 may be used to track more complex channel changes or details, i.e., adapt the equalizer to such changes or details.

An equation for an error term, which is analogous to equation 9 and that can be used for adaptation is given in the following form;

$$e_n = \sum_{k=-K_1}^{K_2} f_k^{n-1} r_{n-k} - \left( I_n + \sum_{l=L_b+1}^{N_b} I_{n-l} b_l + \sum_{l=1}^{L_b} I_{n-l} b_l^{n-1} \right), \tag{10}$$

where $$\sum_{k=-K_1}^{K_2} f_k^{n-1} r_{n-k}$$

represents the compensated signal from the adaptive filter 327, i.e., a multi-tap FIR filter with coefficients that can be adapted or dynamically changed over a received signal burst, operating on the pre-filter output $r_n$; where for the DFE coefficients or feedback taps $\{b_0, b_1, b_2, \ldots, b_{N_b}\}$, $b_0 = 1$ or some constant value is fixed, which can be ensured in DFE coefficient calculation (calculate the coefficients and divide all resultant coefficients by $b_0$), and among the rest of the feedback taps, only a first portion, e.g., the first $L_b$ taps are updated, and another portion, e.g., the rest of the feedback taps $N_b$-$L_b$ are not updated.

There are various reasons that only a portion of the CPR $b_n$ or feedback taps need to be tracked or adapted or dynamically changed to compensate for the channel variation over a particular burst. One reason is due to the adaptive filter 327, e.g., adaptive FIR filter, operating on the pre-filter output $r_n$ to compensates for the phase change and amplitude change caused by the channel fading, and thus the only remaining purpose of updating feedback taps is to compensate for high order channel variation. Without the adaptive filter 327 processing the pre-filter output $r_n$, all of the feedback taps including $b_0$ would need to be updated, in order to compensate for the phase and amplitude variation caused by the channel fading over a transmitted burst. Another reason is the minimum phase or minimum energy delay property of the feedback taps that carries more information on the first few taps than the rest of the taps regarding the high order channel variation. Thus, adaptation on the first few CPR $b_n$ or feedback taps will be more effective than that on the rest of the taps.

For the adaptive filter 327 operating on the pre-filter output, as indicated previously, the tap $f_0^{n-1}$ is to track the phase change and amplitude change in the pre-filter output or signal $r$, over each received signal burst. The other taps or coefficients for the adaptive filter 327 are intended to track higher order channel variations. To formulate the coefficient updating scheme for the adaptive filter coefficients as well as the interference remover coefficients that will be adapted (if any), the error calculation in equation 10 is rearranged as follows:

$$e_n = \left(I_n + \sum_{l=L_b+1}^{N_b} I_{n-l}b_l\right) - \left(\sum_{k=-K_1}^{K_2} f_k^{(n-1)}r_{n-k} + \sum_{l=1}^{L_b} I_{n-l}b_l^{(n-1)}\right), \quad (11)$$

where $e_n$ is fed back to the coefficient adaptor 326 as shown in FIG. 3.

It is noticed that the signs of $b_l''$, $l=1, 2, \ldots, L_b$ are altered for convenience, however this will not be a problem since it is updated in the adaptation scheme and can be offset or negated in their initialization. The matrix form of the error calculation can be represented as follows:

$$e_n = \left(I_n + \sum_{l=L_b+1}^{N_b} I_{n-l}b_l\right) - C'(n)Y(n) \quad (12)$$

where $$C(n) = \begin{bmatrix} f_{K_1}^{(n-1)} \\ \vdots \\ f_0^{(n-1)} \\ f_1^{(n-1)} \\ \vdots \\ f_{K_2}^{(n-1)} \\ b_1^{(n-1)} \\ \vdots \\ b_{L_b}^{(n-1)} \end{bmatrix} \text{ and } Y(n) = \begin{bmatrix} r_{n-K_1} \\ \vdots \\ r_n \\ r_{n+1} \\ \vdots \\ r_{n+K_2} \\ I_{n-1} \\ \vdots \\ I_{n-L_b} \end{bmatrix} \quad (13)$$

The number of coefficients to be adapted is $N=K_1+K_2+L_b+1$. The simplest adaptation illustrated in FIG. 5 or error term (equation 9) is a particular case of (12) and (13) with $K_1=0$, $K_2=0$, and $L_b=0$. This general form of adaptation can be utilized for the adaptation or dynamic updating of the various coefficients in FIG. 3 and FIG. 6 as well as other embodiments, some of which will be further discussed below.

To achieve jointly optimal tracking for these coefficients on each surviving path, a Recursive Least Square (RLS) approach can be used. Generally the coefficient adaptor 326 does the processing and calculations required to provide appropriate coefficients using, e.g., the equations below or other adaptation approaches, e.g., square root algorithm, Hsu, F. M. (1982), which is discussed in "Square-Root Kalman Filtering for High-Speed Data Received over Fading Dispersive HF Channels," IEEE trans. Information Theory, Vol. IT-28, pp. 753-763, September. One RLS adaptation or approach is referred to as the Kalman adaptation, in which the coefficients are updated as follows:

$$\mu_n = Y'(n)P(n-1)Y^*(n) \quad (14)$$
$$K(n) = \frac{1}{\beta + \mu(t)}P(n-1)Y^*(n)$$
$$P(n) = \frac{1}{\beta}[P(n-1) - K(n)Y'(n)P(n-1)]$$
$$C(n) = C(n-1) + K(n)e_n$$

where the parameter $\beta$ controls the tracking speed, C and P are initialized as shown in Equation (15), Y' is the transpose of Y, and Y* is the conjugate of Y. There are solutions to the RLS adaptation with different numerical stability and different efficiency for different number of the coefficients to track.

$$C(0) = \begin{bmatrix} 0 \\ \vdots \\ 1 \\ 0 \\ \vdots \\ 0 \\ -b_1 \\ \vdots \\ -b_{L_b} \end{bmatrix}_{N \times 1} \text{ and } P(0) = \begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix}_{N \times N} \quad (15)$$

From equations 12=14 it will be observed that the coefficient adaptor 326 will be configured to dynamically change one or more coefficients for the adaptive filter over the span of the burst of the receive signal responsive to parameters from the parameter setting function, the minimum phase coefficients, and an error signal $e_n$ provided by the interference remover.

FIG. 6 and FIG. 3, among others, show an interference remover 331 that comprises a feedback filter using Decision Feedback Equalizer (DFE) coefficients with a first coefficient $b_0$ set to 1. The interference remover is operable for reducing interference, e.g., ISI, in the received signal or specifically each burst of the received signal, and in various embodiments can use Maximum Likelihood Sequence Estimation and a Decision Feedback Equalizer or Reduced State Sequence Estimation (RSSE), adaptive RSSE and DFE, or per survivor based adaptive RSSE, etc. For adaptive interference removers as shown in FIGS. 6 and 3 among others, one or more embodiments can use a feedback filter that is configured or initialized in accordance with the minimum phase coefficients as provided by a DFE coefficient calculator with a first coefficient set to a constant value, e.g., 1, and wherein a first portion $L_b$ of the minimum phase coefficients are dynamically changed or adapted over the span of each burst of the receive signal or received signal burst, and wherein a second portion or the remaining ones of the minimum phase coefficients are fixed to the initialized value over the span of the burst of the receive signal or received signal burst.

Figure 7:
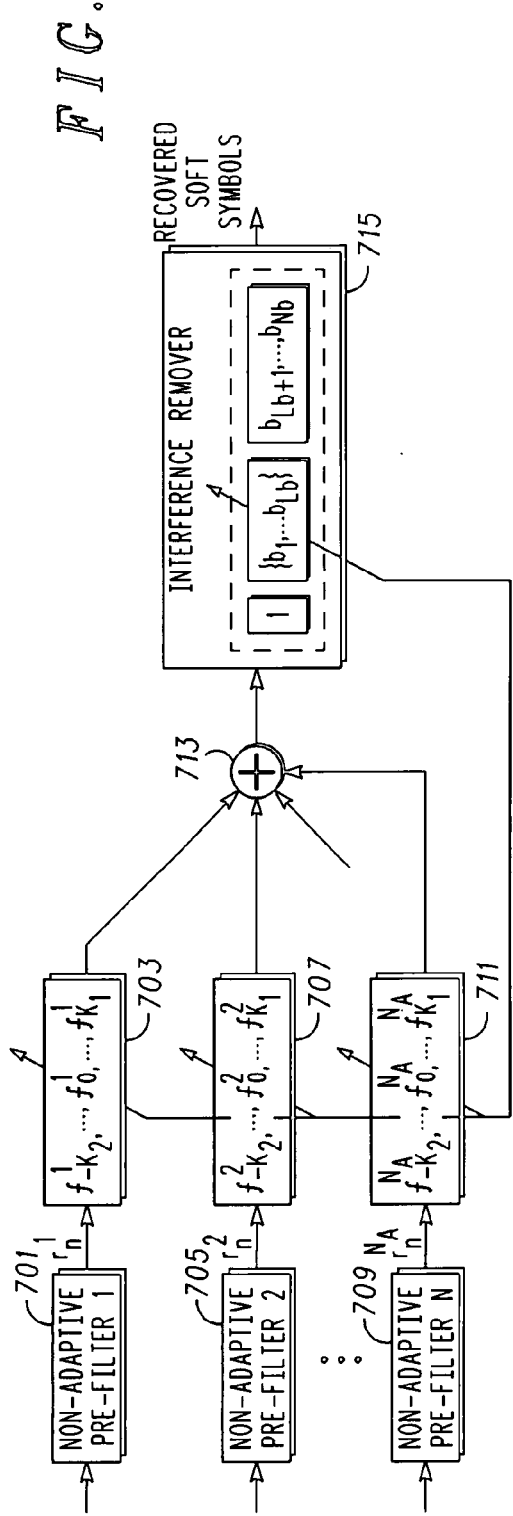
FIG. 7 illustrates a portion of an equalizer employing signal processing similar to FIG. 6 and that is suitable for use in a diversity receiver in accordance with one or more embodiments.

With reference to FIG. 7, a portion of an equalizer which employs signal processing similar to FIG. 6 and which is suitable for use in a diversity receiver in accordance with one or more embodiments will be discussed and described. For typical diversity receivers, two or more RF front-end signals are received from a corresponding two or more receiver front ends, e.g., such as receiver front end 101. Normally, for each front end a channel estimator, analogous to channel estimator 103, is also provided and which operates to provide a channel estimate corresponding to the respective RF front end signal. These estimated channels will be provided to DFE coefficient calculator to generate the non-adaptive or fixed pre-filter coefficients, one for each RF front-end signal and one set of coefficients for an interference remove, i.e., a feedback filter $\{b_0, b_1, \ldots, b_{Nb}\}$. These filters are normally determined jointly to provide the reasonable diversity gain. The DFE coefficient calculator as is known uses all of the respective channel estimates to provide pre-filter coefficients which are specific to the respective pre-filters and to provide a minimum phase CPR that factors in correlation between the respective RF front end signals. FIG. 7 without specifically showing these front ends, channel estimators, or DFE coefficient calculator, illustrates three pre-filters 701, 705, 709 with each respectively coupled to three adaptive filters 703, 707, 711, where the pre-filters and adaptive filters are analogous to the pre-filter 321 and adaptive filter 327. The outputs from the adaptive filters 703, 707, 711 are combined at combiner 713 with the result coupled to an interference remover 715.

The adaptive equalizer for the diversity receiver as illustrated in FIG. 7 for a general situation, can be easily extended from the equalizer for the one-branch receiver described above with reference to FIG. 6. The error calculation in matrix form is similar to Equation (12), except that C(n) and Y(n) are defined as follows:

$$C(n) = \begin{bmatrix} f^1(n) \\ \vdots \\ f^{N_A}(n) \\ b(n) \end{bmatrix}, \; Y(n) = \begin{bmatrix} r^1(n) \\ \vdots \\ r^{N_A}(n) \\ I(n-1) \end{bmatrix} \quad (16)$$

where (17a)

$$f^l(n) = \begin{bmatrix} f_{K_1}^{l(n-1)} \\ \vdots \\ f_0^{l(n-1)} \\ f_1^{l(n-1)} \\ \vdots \\ f_{K_2}^{l(n-1)} \end{bmatrix} \text{ and } r^l(n) = \begin{bmatrix} r_{n-K_1}^l \\ \vdots \\ r_n^l \\ r_{n+1}^l \\ \vdots \\ r_{n+K_2}^l \end{bmatrix}, l = 1, 2, \ldots, N_A$$

$$b(n) = \begin{bmatrix} b_1^{(n-1)} \\ \vdots \\ b_{L_b}^{(n-1)} \end{bmatrix} \text{ and } I(n-1) = \begin{bmatrix} I_{n-1} \\ \vdots \\ I_{n-L_b} \end{bmatrix} \quad (17b)$$

where $r^l(n)$ is the pre-filter output from the lth antenna or receiver front end, and $f^l(n)$ is the coefficients of the adaptive filter that is operating on the pre-filter output of the lth antenna.

FIG. 8 illustrates a portion of an equalizer employing signal processing similar to FIG. 5 and that is suitable for use in a diversity receiver in accordance with one or more embodiments. The comments above with reference to FIG. 7 regarding receiver front ends, channel estimators, and the DFE coefficient calculator apply equally here. Similar to the one-branch receiver and corresponding equalizer of FIG. 5, FIG. 8 illustrates a simple yet practical form of the adaptive structure or equalizer for a diversity receiver. In this form, each antenna or receiver front end requires one adaptive tap, e.g., as shown by adaptive filters 803, 807, 811 respectively, to track its phase change and amplitude change and control its weight in the diversity combining which is provided by combiner 813 (analogous to combiner 713). The output from combiner 813 is provided to interference remover 815, which as depicted need not be adapted or dynamically changed (see FIG. 5 interference remover 503 and above discussions).

It will, as noted above with reference to FIG. 5, be appreciated that the interference remover 815 may be more complex and include adaptation of some of the coefficients over a transmitted burst. This would be one embodiment of the more general structure of FIG. 7. It will further be appreciated that certain parameters, which are not specifically shown in FIG. 5-8, may be required in one or more of these embodiments. Such parameters are shown in general in FIG. 3 and as noted above are provided by the parameter setting function 325.

Thus FIG. 7 and FIG. 8 show adaptive equalizers suitable for diversity receivers which are extensions of FIG. 3 and FIG. 5, wherein the fixed or non-adaptive pre-filter includes a plurality of fixed pre-filters each coupled to a received signal corresponding to a unique branch of a diversity receiver and each providing a unique pre-filtered signal; wherein the adaptive filter includes a plurality of adaptive filters with each coupled to and configured to compensate one of the unique pre-filter signals for changes in phase and amplitude over a received signal burst to provide one of a plurality of compensated signals; wherein the adaptive equalizer further comprises a combiner coupled to each of the plurality of compensated signals, the combiner configured to combine the plurality of compensated signals and provide a resultant signal; and wherein the interference remover is coupled to the resultant signal.

The new adaptive equalizer structures, e.g., as depicted and described with reference to FIGS. 3, 6, 7 have parameters of $K_1, K_2, L_b$, where. The parameter setting function 225 operates to set or select values for these parameters (as well as β described below). To achieve adequate performance from these equalizer structures, these parameters need to be properly selected. Generally the parameter setting function 225 is configured to provide parameters to the coefficient adaptor 326 or adaptation process. From above and as shown in FIG. 3, the parameter setting function 225 provides a first parameter ($K_1, K_2$) that is for setting a number of coefficients for the adaptive or FIR filter (whether a single tap or multi-tap), a second parameter ($L_b$) that is for setting a number of coefficients to be adapted for the interference remover, and a third parameter (β) that is for setting a tracking speed for the coefficient adaptor The appropriate choice of these parameters can be related to the channel fading conditions and noise and interference levels. More specifically, complex channel fading has high order fading details changing over time and thus, more taps may need to be adapted or dynamically tracked over a burst. Furthermore, simple channel fading typically has fewer details to tack and tracking of unnecessary details, e.g., tracking an excess number of filter taps, may result in performance degradation, stability issues, and the like. In addition, in a low interference environment, it can be constructive to track high order fading details for complex fading channels; while in high interference environment, tracking high order fading details with adaptation of more coefficients can be harmful due to the interference disturbance to the adaptive tracking processes or algorithms. The description below explains one or more embodiments of processes for estimating channel complexity and interference levels, then describes one or more approaches for determining the adaptive parameters $\{K_1, K_2, L_b\}$ based on the estimated channel complexity and interference level.

Generally complex channels, statistically, have larger delay spreads of their channel profiles than that of simple fading channels. Channel delay spread refers to the duration of the composite channel. Channel delay spread is reflected in the estimated composite CPR h, as provided by the channel estimator 103 (see also equation 1). However, typically the estimated composite CPR $h_n$ does not have precise timing and thus, it may be difficult to provide an accurate estimate of the channel delay spread. However it has been observed, that the feedback taps $b_n$ or minimum phase CPR calculated from the estimated composite CPR during DFE coefficient calculation contains similar delay spread information and the CPR does not have the timing uncertainty problems associated with the composite CPR $h_n$. Thus the CPR $b_n$ may be used for providing an accurate delay spread estimate. Equation (18) describes one approach or process for measuring the channel delay spread from the CPR or feedback taps $b_n$.

$$D_{spread} = \frac{\sum_{n}^{3} |b_n|^2}{\sum_{n} |b_n|^2} \quad (18)$$

Basically the delay spread is estimated by the ratio of the energy included in the low order feedback taps $b_n$ or CPR coefficients, e.g. first 4 taps $b_0$-$b_3$, to the total energy of the feedback taps. Equation 18 thus provides a ratio of the sum of the squares of the magnitudes of the first 4 taps, divided by the sum of the squares of the magnitude of all such taps or CPR coefficients.

One technique for assessing or determining a noise plus interference level will now be described. Note that in FIG. 3, the channel estimator provides this information as SINR, which is coupled to the parameter setting function 325. Given a received signal $x_n$, as an input to the de-rotator 319, the de-rotated version of $x_n^r$ for, e.g., an EDGE signal, may be denoted as $$x_n = x_n^r e^{-j\frac{3\pi}{8}n}.$$

After the timing and channel estimation provided by the channel estimator 103, the energy of the received signal as determined over and corresponding to the training sequence can be calculated as follows.

$$E_S = \sum_{n=1}^{N} |x_n|^2 \quad (19)$$

Representing the training sequence (see FIG. 2) as $s_n^{TS}$, the received training signal without interference and AWGN can be synthesized by convolving the training sequence with the composite CPR $h_n$ as provided by the channel estimator 103 to provide or determine an estimate for the corresponding received signal. This can be expressed as:

$$\hat{x}_n = s_n^{TS} * h_n. \quad (20)$$

The noise plus interference can be estimated as an error signal or the difference between the synthesized signal or estimated received signal during the training sequence and the actual received signal at the same time and location (input to the channel estimator), which can be expressed as $e_n^{NI} = \hat{x}_n - x_n$. The energy of the noise plus interference can, thus be estimated by $$E_{NI} = \sum_{n=1}^{N} |x_n - \hat{x}_n|^2 \quad (21)$$

The level of noise plus interference can be expressed, measured, or determined as a ratio of Signal (with Noise and Interference) to Noise+Interference (SNIR) with the respective values given in equation 19, 21 as:

$$SNIR = \frac{E_S}{E_{NI}}, \quad (22)$$

Where this estimated noise and interference level is provided by the channel estimator 103 to the parameter setting function 325, in FIG. 3

Figure 9:
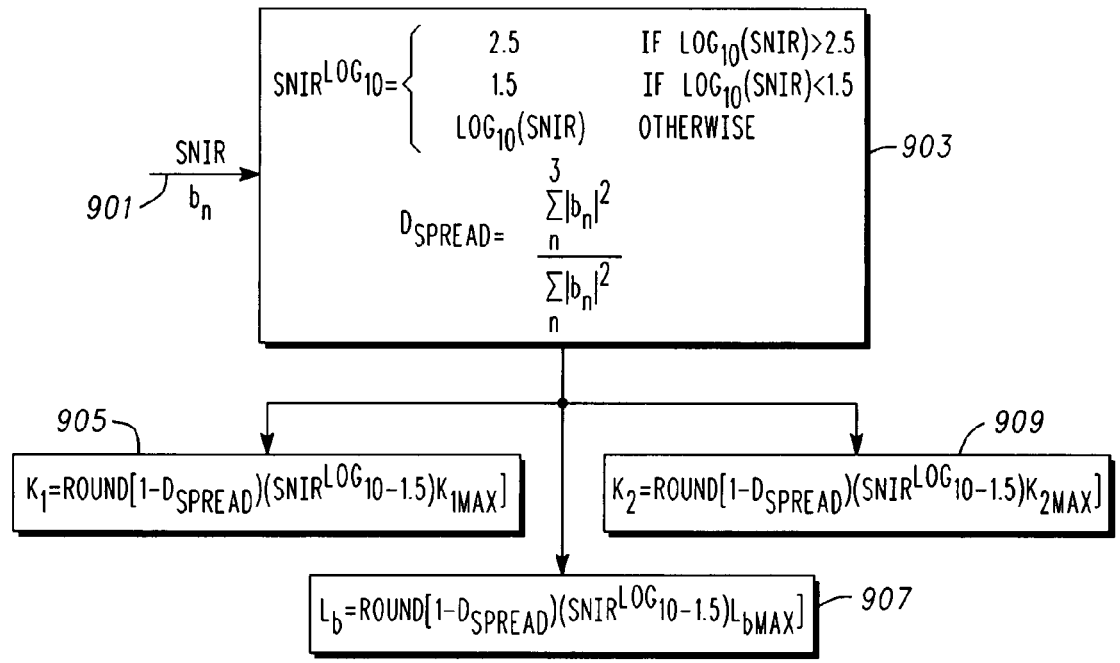
FIG. 9 shows a flow chart of processes that may be used to select various parameters for the equalizer structures shown in one or more of FIG. 3, FIG. 5-FIG. 8, in accordance with one or more embodiments.

Referring to FIG. 9, a flow chart of processes that may be used, e.g., by the parameter setting function 225, to select various parameters for the equalizer structures shown in one or more of FIG. 3, FIG. 5-FIG. 8, in accordance with one or more embodiments will be discussed and described. Given the estimated level of interference plus noise measured as SNIR and the minimum phase CPR coefficients $b_n$ 901, various approaches to determine one or more of the adaptive parameters are illustrated by FIG. 9. The delay spread $D_{spread}$ is calculated and the SNIR is converted on to a log scale and limited to provide $SNIR_1^{LOG_{10}}$ as depicted at 903 and as follows $$SNIR_1^{Log10} = \begin{cases} 2.5 & \text{if } \log_{10}(SNIR) > 2.5 \\ 1.5 & \text{if } \log_{10}(SNIR) < 1.5. \\ \log_{10}(SNIR) & \text{Otherwise} \end{cases} \quad (23)$$

The respective parameters $K_1$, $K_2$, and $L_b$ are, then, determined or established or selected, e.g., twice for each transmitted or specifically received burst (once for the half of the burst earlier that the training sequence and once for the half of the burst later than the training sequence) as follows and illustrated, respectively, at 905, 907, 909:

$$\begin{cases} K_1 = \text{round}\left[(1 - D_{spread})(SNIR_1^{\text{Log}10} - 1.5)K_{1\max}\right] \\ K_2 = \text{round}\left[(1 - D_{spread})(SNIR_1^{\text{Log}10} - 1.5)K_{2\max}\right], \\ L_b = \text{round}\left[(1 - D_{spread})(SNIR_1^{\text{Log}10} - 1.5)L_{b\max}\right] \end{cases} \quad (24)$$

where $\{K_{1\max}, K_{2\max}, L_{b\max}\}$ essentially control a maximum level of complexity for the equalizer structures.

Experimental observation suggests that setting $K_{1\max}=2$, $K_{2\max}=0$, and $L_{b\max}=3$ is sufficient to cover many fading environments as specified in 3GPP ($3^{rd}$ Generation Partnership Project). It will be appreciated that other standards and proper characterization of other channels and associated environments may result in different settings for these maximum parameters. The 2, 0, 3 settings indicate that the maximum complexity involves adaptation of 3-taps for the adaptive filter 321 operating on the pre-filter output and adaptation of 3-feedback taps, $b_1$-$b_3$, in the interference remover 331, 715, 815 after the first tap $b_0$ is fixed to 1, with the remainder of the $N_b$ taps, i.e., 3 feedback taps, fixed or not adapted over a particular burst.

To reduce implementation complexity with some limited performance compromise for complex channel fading, the simplest adaptation setting $K_{1\max}=0$, $K_{2\max}=0$, $L_{b\max}=0$ can be chosen. This simplest setting results in $K_1=0$, $K_2=0$, and $L_b=0$, which means the dynamic decision on $K_1$, $K_2$, and $L_b$ is avoided for the adaptive filters, e.g., adaptive filter 327, etc and no feedback taps in the interference removers are adapted. Thus only one tap of adaptive filter 327, 703, 707, 711, which is operating on the pre-filter output, is dynamically adapted or changed over a burst as shown in FIGS. 5, 8. Furthermore, for one coefficient adaptation, the operations in the RLS updating (equations 14, 15) involve only scalar operations and thus, are much more efficient than a more complex adaptation. As explained above, this simplest adaptation compensates for the first order channel variation. It has been observed that the performance compromise with this simplest adaptation is only on complex fading channels, such as HT100 and EQ100 channels, by about 1 dB, a small degradation when compared to more than 10 dB gain with $K_{1\max}=2$, $K_{2\max}=0$, and $L_{b\max}=3$ for the new equalizers structures relative to known RSSE equalizer structures (e.g., FIG. 4). Thus the simplest adaptation provides approximately 9 dB improvement over known equalizers for some channel conditions.

Figure 10:
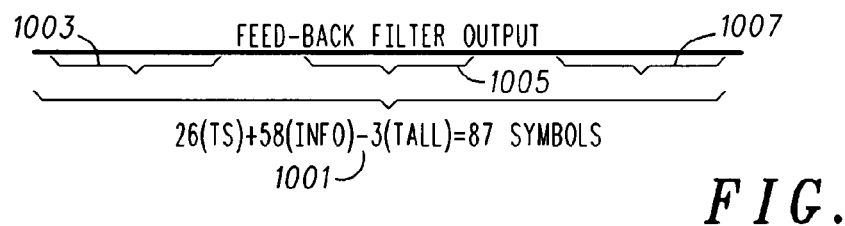
FIG. 10 illustrates an approach for adjusting tracking speed used to adapt various coefficients associated with the equalizer structures of FIG. 3, FIG. 5-FIG. 8, in accordance with one or more embodiments.

Referring to FIG. 10, an approach for adjusting a tracking speed parameter used to adapt various coefficients associated with the equalizer structures of FIG. 3, FIG. 5-FIG. 8, in accordance with one or more embodiments will be discussed and described. The parameter $\beta$ in Equation (14) controls the tracking speed for adapting or dynamically changing coefficients for the adaptive filters or coefficients for the interference removers in the respective FIGs. Properly selecting or choosing the tracking speed for RLS adaptation approach or any other approach facilitates appropriate adaptation of the equalizers and thus, performance of the equalizers. The parameter setting function 325 operates to select $\beta$ in accordance with the processes discussed below. As discussed below, the parameter $\beta$ is selected or determined based on and is thus dependent on an interference level and a rate of change, e.g., rate of change in the envelope, in the pre-filter signal. Intuitively, the adaptive tracking speed should be a function of the speed or rate of channel variation. However, the capability of tolerating AWGN and interference in the adaptation processes can decrease as the tracking speed goes up or increases. Thus, in high interference or high noise environments, even if the received signal is experiencing fast fading, the tracking speed of the equalizer may be slower than that for a signal experiencing the same rate of fading in a low interference or low AWGN environment. Therefore, the appropriate tracking speed can be a function of the speed of channel variation and the noise plus interference level.

The measurement of noise plus interference level has been described in Equation 22 (and the corresponding discussions) and has been discussed with respect to dynamic decisions or adaptive selection of parameters $\{K_1, K_2, L_b\}$. The same measurement can be used in a determination of the tracking speed control parameter $\beta$. To estimate the fading speed, it is observed that the speed of channel variation is typically reflected in the envelope variation of the received signal $r_n$ after the pre-filter. However some modulation schemes yield constant envelop signals whereas other schemes do not. For example, GMSK and others yield a constant envelop signal, whereas 8PSK modulation is not a constant or equal envelop modulation. For non-constant envelop modulation, averaging the envelop magnitude over a moving window in the absence of fading should yield a relatively fixed or constant value and thus observed variations in this average magnitude can be used to measure the fading speed. Thus, one approach for determining fading speed even for non-constant envelop modulations, e.g., 8PSK, includes establishing a plurality of windows with equal time spacing on the signal at the output of the non-adaptive pre-filter. For each window, the average or sum of the envelope magnitude is calculated. The rate of change of these envelope averages can be used for measuring or assessing the channel variation or rate of such variation.

As one example, consider the EDGE signal of FIG. 2 and more specifically, the right half burst, which involves 87 symbols: 26 training symbols, followed by 58 information symbols, and then by 3 tail symbols, as also shown in FIG. 1001. With the 87 symbols, in one or more embodiments, three windows 1003, 1005, 1007 are allocated with equal spacing between windows, and each encompassing 20 symbols. The sum of the envelope magnitude of the received signal r, from the pre-filter within each window is calculated, e.g., by summing the magnitudes or square of the magnitude of all samples over the window, resulting in $\{E_0, E_n, E_2\}$. The rate of the envelope change due to fading can be represented by:

$$R = \log(R_1) + \log(R_2), \quad (25)$$

where $$R_1 = \begin{cases} \dfrac{E_1}{E_0}, & \text{if } E_1 \geq E_0 \\ \dfrac{E_0}{E_1}, & \text{if } E_0 > E_1 \end{cases} \quad \text{and} \quad R_2 = \begin{cases} \dfrac{E2}{E_1}, & \text{if } E_2 \geq E_1 \\ \dfrac{E_1}{E_2}, & \text{if } E_1 > E_2 \end{cases}. \quad (26)$$

The tracking speed control parameter $\beta$ can be determined as a function of the rate of envelope change in the pre-filter signal and noise plus interference level in the received signal, e.g., by:

$$\beta = 1 - 1.25R + 0.1\left[1.5 - SNIR_2^{\text{Log}10}\right], \quad (27)$$

where $$SNIR_2^{\text{Log}10} = \begin{cases} 1.5 & \text{if } \log_{10}(SNIR) > 1.5 \\ 0 & \text{if } \log_{10}(SNIR) < 0, \text{ and} \\ \log_{10}(SNIR) & \text{Otherwise} \end{cases} \quad (28)$$

where SNIR is calculated from equation 22 above. The tracking speed control parameter $\beta$ in some embodiments may also be bounded as follows:

$$\beta = \begin{cases} \beta_{min} & \text{if } \beta < \beta_{min} \\ \beta_{max} & \text{if } \beta > \beta_{max}, \\ \beta & \text{otherwise} \end{cases} \quad (29)$$

with, in some embodiments, the lower bound $\beta_{min}=0.8$ and the upper bound $\beta_{max}=0.975$.

Figure 11:
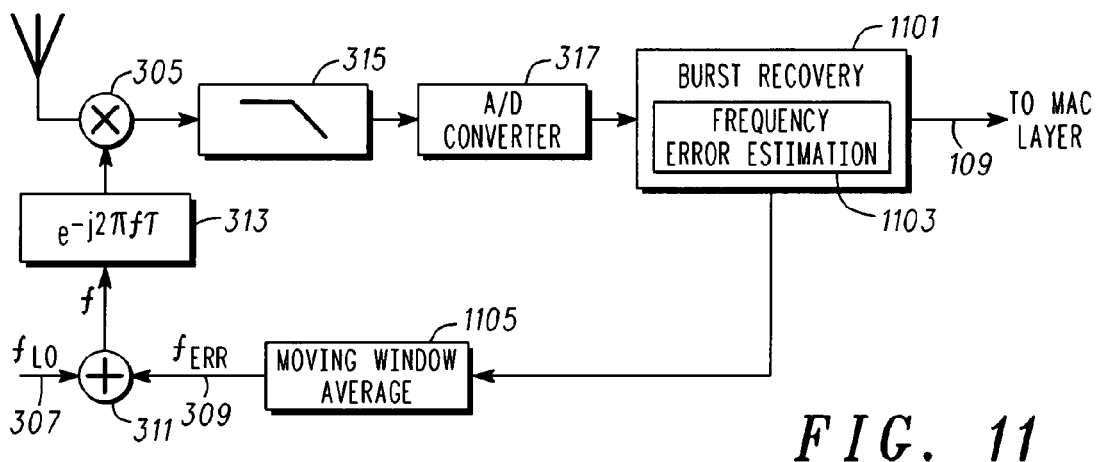
FIG. 11 shows in overview a portion of the FIG. 3 receiver and equalizer and will be used to illustrate frequency error estimation, in accordance with one or more embodiments.

Referring to FIG. 11 which shows in overview a portion of the FIG. 3 receiver and equalizer, one or more approaches for determining an estimate of frequency error, in accordance with one or more embodiments will be discussed and described. Frequency error in the received signal can be due to or caused by fading or RF front-end LO error relative to the transmitter LO. Both of the frequency errors can be time varying in practical products. The RF front-end LO offset or error changes with time due to operation environment changes, e.g., particularly with temperature of the reference crystal oscillator used to generate the LO. For the overall system to operate properly, the system requires that the LO error be compensated for, particularly for high modulation alphabets. One approach for this compensation is to have a demodulator or here the burst recovery functions 1101 (derotator 319, channel estimator 103, equalizer 105, decoder 109 of FIGS. 1, 3) to estimate and report the frequency error so that the frequency error due to LO error or offset can be compensated. The frequency error due to fading changes with time, yet its average over time is 0. Thus, the system of FIG. 11 will collect the frequency error estimates from the burst recovery function 1101 on a transmitted burst by burst basis via the frequency error estimator 1103, and average these frequency errors over a moving window 1105 to remove the fluctuation due to fading, and then use the average or $f_{err}$ at 309 to update the LO frequency at 307 via the adder 311 to provide a corrected frequency f to the phasor generator 313 and thus mixer 305. The capabilities discussed below can be performed by the LO error estimator 324 of FIG. 3. It will be appreciated that some functions, e.g., frequency, frame, and symbol synchronization functions, found in practical receivers are not specifically shown. Furthermore, the removal of a frequency error or frequency tracking as described here will ordinarily be coordinated with such functions as well as various media access control (MAC) functions and thus some interface or interaction with a MAC process or layer and the determination of and application of a frequency error may be present.

The new adaptive tracking structures, as shown in FIGS. 3, 5-8 are particularly suitable for the frequency error estimation. As indicated above, one feature or function of the adaptive filters 327, 501, 703, etc, and 803, etc. is to compensate for phase change and amplitude change in the received signal at the output of the corresponding pre-filter. The phase change $\phi_n$ is directly related to the frequency error $f_e$ by $$\phi_n = 2\pi f_e n\Delta t \quad (30)$$

where n is the symbol index and $\Delta t$ is a symbol duration.

Thus, the frequency error can be derived from the phase change that the adaptation of the adaptive filter has compensated for. As indicated above, one of the adaptive filter coefficients $f_0''$ operating on the pre-filter output compensates for the phase change and amplitude change in the received signal. Let $f_0''$ be the adaptive coefficient $f_0''$ on the final survivor path, then the negative phase of $f_0''$ can be considered as the estimate of the phase change, $\hat{\phi}_n$ for the frequency estimation. Thus, the phase change can be estimated from $f_0''$ by $$\hat{\phi}_n = -\tan^{-1}\left(\frac{Im(f_0^n)}{|f_0^n|}\right) \approx -\frac{Im(f_0^n)}{|f_0^n|} \quad (31)$$

where the approximation is made with the consideration that the phase change within half a burst is relatively small. Considering the EDGE burst structure in FIG. 2, the adaptation is made from symbol index 14 to 74 for the right half of the burst and from −14 to −74 for the left half of the burst (i.e., the center of training sequence is n=0), resulting in the estimate of the phase change $\hat{\phi}_n$, n=−74, ..., −14, +14, ..., +74. By minimizing the error energy via the following expression:

$$E = \sum_{n=-14}^{-74} [\hat{\phi}_n - 2\pi f_e n\Delta t]^2 + \sum_{n=14}^{74} [\hat{\phi}_n - 2\pi f_e n\Delta t]^2, \quad (32)$$

the frequency error can then be estimated as follows $$\hat{f}_e = \frac{\sum_{n=-14}^{-74} n\hat{\phi}_n + \sum_{n=14}^{74} n\hat{\phi}_n}{4\pi\Delta t \sum_{n=14}^{74} n^2} = -0.1573\left\{\sum_{n=-14}^{-74} n\hat{\phi}_n - \sum_{n=14}^{74} n\hat{\phi}_n\right\}. \quad (33)$$

Considering the delay between the tracked phase and the actual phase and the approximation made in Equation (31), the final frequency estimation is modified with a correction factor C as follows $$\hat{f}_e = -0.1573C\left\{\sum_{n=-14}^{-74} n\hat{\phi}_n - \sum_{n=14}^{74} n\hat{\phi}_n\right\} \quad (34)$$

where C is a constant. With the tracking speed control parameter given in Equation (27), it has been experimentally determined that C=1.5 is a reasonable choice for the broad operation range of GSM/EDGE although other values for C may be indicated for other communication protocols or for other tracking speed control approaches.

The above described frequency error estimation algorithm is based on the adaptive coefficient $f_0''$ on the final surviving path, which is determined after the last stage of trellis pruning in an MLSE or RSSE interference remover. In other words, during the trellis pruning, all 16 copies of $f_0''$ on the 16 surviving paths at each stage of the pruning have to be stored. In an EDGE case, a half-burst has 61 symbols, thus 61×16=976 storage units are needed to store these coefficients. To reduce the storage requirement, a simplified approach is proposed.

With the Viterbi Algorithm (VA), at the end of each stage of trellis pruning, there are 16 surviving paths. Assume current trellis pruning is finished at the n-th symbol index, resulting in 16 surviving paths. By choosing the strongest surviving path from the 16 surviving paths, and tracing back by m steps on the strongest surviving path, the adaptive coefficient $f_0''^{n-m}$ will be found. This adaptive coefficient from tracing back on the strongest surviving path will be considered as the adaptive coefficient on the final surviving path. With this approach, (m+1)×16 storage units are needed. In practice, it has been experimentally determined that m=1 can be used with negligible performance compromise.

From the above discussions, the local oscillator (LO) error estimator 324 provides a frequency error estimate based on a coefficient $f_0$ of the adaptive filter as that coefficient is adapted over a received signal burst essentially by accumulating phase errors over the burst.

Figure 12:
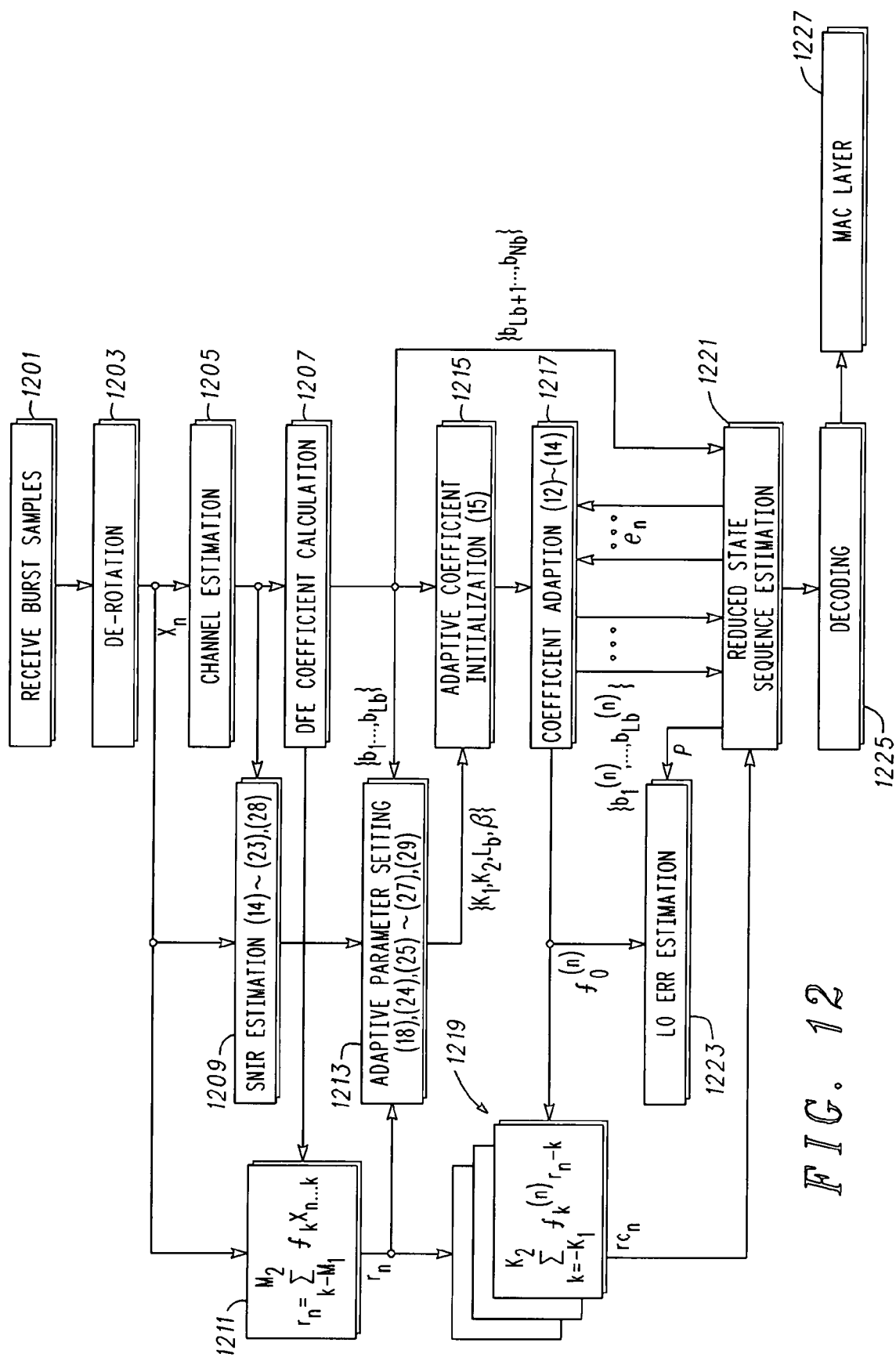
FIG. 12 shows a flow chart illustrating representative methods of equalization in accordance with one or more embodiments.

Referring to FIG. 12, a flow chart illustrating representative methods of equalization in accordance with one or more embodiments will be discussed and described. The processes or methods illustrated by FIG. 12 are generally analogous to one or more of the functions discussed and described above with reference to one or more of the earlier FIGs. and thus much of the discussion here will be in summary or overview form with the reader referred to the above more detailed comments for specifics. The processes or methods shown by FIG. 12 can be implemented via the above described structures or others with similar or analogous functionality or capabilities. The processes and methods illustrated in FIG. 12 may be repeated as needed or required, e.g., for each received signal burst or training sequence.

As shown in FIG. 12, the process or method of adaptively equalizing signals transmitted over a communication channel begins with receiving samples corresponding to a burst 1201. These samples are de-rotated in accordance with the respective modulation type to provide the received signal $x_n$ 1203. The received signal is coupled to and used for determining or calculating a channel estimation, i.e., calculating a composite CPR $h_n$ from the known training sequence located within the burst 1205. Next, DFE coefficient calculation is done using the composite CPR 1207, where this process provides pre-filter coefficients $f_k$ and a near minimum phase CPR $\{b_n : b_0=1, b_1 \ldots b_{Nb}\}$. Additionally a noise and interference level is determined or estimated 1209 using $x_n$ from 1203 and the composite CPR $h_n$ from 1205. In one or more embodiments, this can include determining SINR(s) in accordance with above equations 19-23 and 28. Generally the processes shown at 1205 and 1209 can be performed by a channel estimator, e.g., the channel estimator 103.

A non-adaptive pre-filter, e.g. pre-filter 221, is configured using the pre-filter coefficients $f_k$ from 1207 and then the received signal $x_n$ from 1203 is processed by that pre-filter 1211 to provide a pre-filtered signal $r_n$. As illustrated at 1211, one process includes filtering each burst of the receive signal with a fixed pre-filter to provide a pre-filter signal, where the fixed pre-filter is configured in accordance with filter coefficients provided one time for each half burst or each data field (203, 207) of the receive signal. In one or more embodiments, parameters for setting adaptation characteristics or adaptive parameters are determined or calculated using the noise and interference level(s) (SINR) from 1209, the envelope of the pre-filtered signal $r_n$ from 1211, and the CPR $b_n$ from 1207. In various embodiments this includes setting adaptive parameters $\{K_1, K_2, L_b, \beta\}$ using above equations 18, 24, 25-27, 29 and in some instances externally supplied limit values for one or more of these parameters. It is also noted that these parameters can be and typically are determined twice for each burst, once for movement to the left (negative symbol indices) of the training sequence and again for movement to the right (positive symbol indices) of the training sequence (see FIG. 2). Given the adaptive parameters $\{K_1, K_2, L_b, \beta\}$ from 1213 and the minimum phase CPR coefficients $\{b_1 \ldots b_{Nb}\}$ from 1207, all parameters as well as coefficients, which will be adapted or dynamically changed as data symbols from the burst are further equalized or compensated, are initialized 1215, i.e., initialization of these parameters is performed in accordance with equation 15. The processes in 1213 can be performed by, e.g., the parameter setting function 325 and the parameters and coefficients are initialized 1215 in the coefficient adaptor 326.

Coefficient adaptation 1217 using the initialized parameters and coefficients, operates or functions to provide the coefficients $f_k^{(n)}$ for the adaptive filters 327, etc as well the portion, if any, of the minimum phase CPR coefficients $b_1^{(n)} \ldots b_{L_b}^{(n)}$ which are being adapted. The coefficient adaptation can operate in accordance with equations 12-14 to adapt the respective coefficients for each surviving path. The adaptation can be performed on a symbol by symbol basis as indicated by the superscript (n) on the f and b coefficients or these coefficients can be adapted or updated from time to time, e.g., every m symbols or based on some schedule or the like, to save some processing resources at some potential performance costs.

The coefficients $f_k^{(n)}$ are provided to and used to configure the adaptive filters 1219 (one per surviving path as suggested by multiplicity of filters depicted). The adaptive filters process or adaptively filter the pre-filtered signal $r_n$ to provide a corresponding compensated signal $rc_n$ (compensated for changes in phase and amplitude over the span of the burst of the receive signal) with one compensated signal provided for each surviving path. Thus 1219 illustrates adaptively-filtering the pre-filter signal with an adaptive filter to provide a compensated signal, which is compensated for changes in phase and amplitude over a span of the burst of the receive signal. The adaptively filtering the pre-filter signal with an adaptive filter further comprises or is facilitated by configuring the adaptive filter in accordance with one or more coefficients that are dynamically changed over the span of the burst of the receive signal responsive to adaptation parameters and an error value $e_n$ provided by an interference remover.

The compensated signals $rc_n$ the CPR coefficients $b_1^{(n)} \ldots b_{L_b}^{(n)}$ with one set per surviving path, and the balance $N_b$-$L_b$ of the CPR coefficients from 1207 are provided to a sequence estimation process 1221. The sequence estimation can be a reduced state sequence estimator as shown or more generally can be performed by the interference remover 331, etc. The sequence estimation provides an $e_n$ value for each surviving path which is fed back to and used in the coefficient adaptation 1217. The sequence estimation process 1221 also provide in one or more known manners soft symbols or information to a decoding process 1225. The decoding process 1225 operates in a fashion that will vary in accordance with an air interface protocol in a known manner to perform functions such as error correction, decryption, etc., to provide hard information or bits to a MAC layer 1227. The sequence estimation process or more generally interference removal is reducing interference in the burst of the receive signal with, e.g., an interference remover, to provide corresponding soft symbols, where the interference remover or RSSE is configured in accordance with minimum phase coefficients that are initialized one time for each half burst (once for the data field that is earlier than the training sequence and once for the data field that is later than the training sequence) of the receive signal. Depending on the embodiment and specifics thereof, the reducing interference in the burst of the receive signal with an interference remover configured in accordance with minimum phase coefficients can include configuring the interference remover in accordance with minimum phase coefficients that include a first coefficient set to 1, a first portion of the minimum phase coefficients that are dynamically changed over the span of the half burst of the receive signal, and a second portion of the minimum phase coefficients that are fixed to an initialized value over the span of the burst of the receive signal.

Furthermore, the $f_0^{(n)}$ coefficients are provided to a LO error estimation process 1223 and used to provide an estimate for LO error in accordance with equations 31-34. The LO error estimation process can also use the efficient scheme discussed above wherein $f_0^{(n-m)}$ from the surviving path, i.e., $f_0$ at symbol n traced back m symbols, is used for the frequency error estimation. Since the surviving path is determined at the sequence estimation 1221, the LO error estimation 1223 is provided the appropriate path information, e.g., surviving path index p, by the sequence estimation 1221. Since the sequence estimation is operating on the transmitted burst in two stages, i.e., from the training sequence to the left and to the right, there will be two surviving path indications per burst and one frequency error estimation per burst (see above equations).

As discussed above a first order approximation to the channel variation over time within, e.g., an EDGE burst, due to fading and RF front-end LO error can be represented as a complex variable multiplied on the received signal. This approximation leads to a simple and effective adaptation structure, which is one tap adaptation by a newly proposed adaptive filter, which is multiplied on the pre-filter output for each surviving path. To compensate for changes of higher order fading details, a more general structure of per-survivor based adaptive RSSE was described. The general structure includes: an adaptive FIR filter operating on the pre-filter output for each surviving path and an RSSE where the first feedback tap in the RSSE is fixed or set to 1 for all surviving paths, a few ($L_b$) feedback taps after the $1^{st}$ feedback tap are adapted for each surviving path, and the rest of the feedback taps are fixed and equal for all surviving paths. Since one of the adaptive taps is specifically responsible for compensating the phase change and amplitude change caused by fading and RF front-end LO error, that tracked tap can thus be used to derive the compensated phase change, thus the frequency error in the received signal. A set of techniques have been developed to dynamically set the adaptive parameters, including the adaptive tracking speed, based on analysis of channel fading condition and interference conditions. This dynamic decision of adaptive coefficients ensure near optimal performance on, e.g., the wide operation rage over which GSM/EDGE system operates.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An adaptive equalizer for a communication channel, the adaptive equalizer comprising:
   a fixed pre-filter configured to be coupled to a received signal and provide a pre-filter signal;
   an adaptive filter coupled to and configured to compensate the pre-filter signal for changes in phase and amplitude; and
   an interference remover coupled to the adaptive filter and configured to reduce interference in the received signal,
   wherein the interference remover further comprises a feedback filter using Decision Feedback Equalizer (DFE) coefficients with a first coefficient $b_0$ set to a constant value.

2. The adaptive equalizer of claim 1 wherein the interference remover uses Maximum Likelihood Sequence Estimation and a Decision Feedback Equalizer.

3. The adaptive equalizer of claim 1 wherein the interference remover uses Reduced State Sequence Estimation (RSSE) and a Decision Feedback Equalizer (DFE) with the first coefficient $b_0$ set to a constant value.

4. The adaptive equalizer of claim 3:
   wherein the interference remover includes an adaptive interference remover; and
   wherein the adaptive equalizer further comprises: a coefficient adaptor configured for adapting a portion of DFE coefficients over a received signal burst with another portion of the DFE coefficients being fixed over the received signal burst.

5. The adaptive equalizer of claim 1
   wherein the adaptive filter is further configured for compensating the pre-filter signal for changes in phase and amplitude over a received signal burst and further comprises a multi tap finite impulse response (FIR) filter; and
   wherein the adaptive equalizer further comprises a coefficient adaptor configured to determine and dynamically change coefficients for the multi-tap FIR filter over the received signal burst.

6. The adaptive equalizer of claim 5 further comprising a parameter setting function that is configured to provide parameters to the coefficient adaptor, the parameters used by the coefficient adaptor to determine and dynamically change the coefficients.

7. An adaptive equalizer for a communication channel, the adaptive equalizer comprising:
   a fixed pre-filter configured to be coupled to a received signal and provide a pre-filter signal;
   an adaptive filter coupled to and configured to compensate the pre-filter signal for changes in phase and amplitude; and
   an interference remover coupled to the adaptive filter and configured to reduce interference in the received signal,
   wherein the adaptive filter is further configured for compensating the pre-filter signal for changes in phase and amplitude over a received signal burst and further comprises a multi tap finite impulse response (FIR) filter; and
   wherein the adaptive equalizer further comprises a coefficient adaptor configured to determine and dynamically change coefficients for the multi-tap FIR filter over the received signal burst;
   the adaptive equalizer further comprising a parameter setting function that is configured to provide parameters to the coefficient adaptor, the parameters used by the coefficient adaptor to determine and dynamically change the coefficients,
   wherein the parameter setting function is configured to provide parameters including one or more of; a first parameter ($K_1$, $K_2$) setting a number of coefficients for the multi-tap FIR filter, a second parameter ($L_b$) setting a number of coefficients to be adapted for the interference remover, and a third parameter ($\beta$) setting a tracking speed for the coefficient adaptor.

8. An adaptive equalizer for a communication channel, the adaptive equalizer comprising:
- a fixed pre-filter configured to be coupled to a received signal and provide a pre-filter signal;
- an adaptive filter coupled to and configured to compensate pre-filter signal for changes in phase and amplitude; and
- an interference remover coupled to the adaptive filter and configured to reduce interference in the received signal,
- wherein the adaptive filter comprises a finite impulse response (FIR) filter with a single tap and corresponding coefficient, the FIR filter configured to compensate for phase and amplitude changes in the pre-filter signal over a received signal burst on a symbol by symbol basis.

9. The adaptive equalizer of claim 8 wherein the corresponding coefficient of the single tap FIR filter is adapted over the received signal burst, where adaptation of the corresponding coefficient is in accordance with a parameter (β) that corresponds to a tracking speed of the adaptation.

10. The adaptive equalizer of claim 9 wherein the parameter (β) is dependent on an interference level and a rate of change in the pre-filter signal.

11. An adaptive equalizer for a communication channel, the adaptive equalizer comprising:
- a fixed pre-filter configured to be coupled to a received signal and provide a pre-filter signal;
- an adaptive filter coupled to and configured to compensate the pre-filter signal for changes in phase and amplitude; and
- an interference remover coupled to the adaptive filter and configured to reduce interference in the received signal,
- wherein the fixed pre-filter includes a plurality of fixed pre-filters each coupled to a received signal corresponding to a unique branch of a diversity receiver and each providing a unique pre-filtered signal;
- wherein the adaptive filter includes a plurality of adaptive filters with each coupled to and configured to compensate one of the unique pre-filter signals for changes in phase and amplitude over a received signal burst to provide one of a plurality of compensated signals;
- wherein the adaptive equalizer further comprises a combiner coupled to each of the plurality of compensated signals, the combiner configured to combine the plurality of compensated signals and provide a resultant signal; and
- wherein the interference remover is coupled to the resultant signal.

12. An adaptive equalizer for a communication channel, the adaptive equalizer comprising:
- a fixed pre-filter configured to be coupled to a received signal and provide a pre-filter signal;
- an adaptive filter coupled to and configured to compensate the pre-filter signal for changes in phase and amplitude;
- an interference remover coupled to the adaptive filter and configured to reduce interference in the received signal; and
- a local oscillator (LO) error estimator that provides a frequency error estimate based on a coefficient of the adaptive filter as that coefficient is adapted over a received signal burst.

13. An adaptive equalizer for a communication channel, the adaptive equalizer comprising:
- a fixed pre-filter coupled to a receive signal and configured to provide a pre-filter signal, the fixed pre-filter configured in accordance with filter coefficients provided by a decision feedback equalizer (DFE) coefficient calculator, the filter coefficients provided one time for each data field in a burst of the receive signal;
- an adaptive filter coupled to the pre-filter signal and configured to compensate the pre-filter signal for changes in phase and amplitude over a span of the burst of the receive signal to provide a compensated signal; and
- an interference remover coupled to the compensated signal and configured to reduce interference in the burst of the receive signal and to provide corresponding soft symbols, the interference remover including a feedback filter configured in accordance with near minimum phase coefficients provided by the DFE coefficient calculator, the near minimum phase coefficients provided one time for the each data field in the burst of the receive signal.

14. The adaptive equalizer of claim 13 wherein the adaptive filter is a finite impulse response (FIR) filter configured in accordance with a single coefficient, the single coefficient dynamically changed over the span of the burst of the receive signal.

15. The adaptive equalizer of claim 13 wherein the feedback filter is configured in accordance with the near minimum phase coefficients with a first coefficient set to a constant value, a first portion of the near minimum phase coefficients dynamically changed over the span of the burst of the receive signal, and a second portion of the near minimum phase coefficients fixed over the span of the burst of the receive signal.

16. The adaptive equalizer of claim 13 further comprising a coefficient adaptor configured to dynamically change a coefficient for the adaptive filter over the span of the burst of the receive signal responsive to parameters, the near minimum phase coefficients, and an error signal provided by the interference remover.

17. The adaptive equalizer of claim 16 wherein the parameters are determined for the burst of the receive signal and determined again for another burst of the receive signal.

18. A method of adaptively equalizing signals transmitted over a communication channel, the method comprising:
- filtering a burst of a receive signal with a fixed pre-filter to provide a pre-filter signal, the fixed pre-filter configured in accordance with filter coefficients provided one time for each data field in the burst of the receive signal;
- adaptively filtering the pre-filter signal with an adaptive filter to provide a compensated signal, which is compensated for changes in phase and amplitude over a span of the burst of the receive signal; and
- reducing interference in the burst of the receive signal with an interference remover to provide corresponding soft symbols, the interference remover configured in accordance with near minimum phase coefficients that are initialized one time for the each data field in the burst of the receive signal.

19. The method of claim 18 wherein the adaptively filtering the pre-filter signal with an adaptive filter further comprises configuring the adaptive filter in accordance with one or more coefficients that are dynamically changed over the span of the burst of the receive signal responsive to adaptation parameters and an error provided by the interference remover.

20. The method of claim 18 wherein the adaptively filtering the pre-filter signal with an adaptive filter further comprises adaptively filtering the pre-filter signal with a finite impulse response (FIR) filter with a single tap and corresponding coefficient.

21. The method of claim 20 wherein the adaptively filtering the pre-filter signal with a finite impulse response (FIR) filter with a single tap and corresponding coefficient further comprises adapting the corresponding coefficient over each data field in the burst of the receive signal in accordance with a schedule and in accordance with a parameter ($\beta$) that corresponds to a tracking speed of the adaptation.

22. The method of claim 18 wherein the reducing interference in the burst of the receive signal with an interference remover configured in accordance with near minimum phase coefficients further includes configuring the interference remover in accordance with near minimum phase coefficients that include a first coefficient set to a constant value, a first portion of the near minimum phase coefficients that are dynamically changed over the burst of the receive signal, and a second portion of the minimum phase coefficients that are fixed to an initialized value over the each data field in the burst of the receive signal.

* * * * *